United States Patent
Ou et al.

(10) Patent No.: US 8,473,269 B1
(45) Date of Patent: Jun. 25, 2013

(54) SYSTEM-LEVEL HARDWARE AND SOFTWARE DEVELOPMENT AND CO-SIMULATION SYSTEM

(75) Inventors: Jingzhao Ou, Alhambra, CA (US); Roger B. Milne, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 1366 days.

(21) Appl. No.: 11/711,436

(22) Filed: Feb. 27, 2007

(51) Int. Cl.
*G06F 17/50* (2006.01)

(52) U.S. Cl.
USPC .......................................................... 703/14

(58) Field of Classification Search
CPC .................................................. G06F 17/5022
USPC ........................................ 703/6–22; 716/106
See application file for complete search history.

(56) References Cited

U.S. PATENT DOCUMENTS

| | | | | |
|---|---|---|---|---|
| 5,771,370 A * | 6/1998 | Klein | | 703/13 |
| 5,870,588 A * | 2/1999 | Rompaey et al. | | 703/13 |
| 5,987,243 A * | 11/1999 | Aihara | | 703/17 |
| 7,110,935 B1 | 9/2006 | Hwang et al. | | |
| 2002/0199173 A1 * | 12/2002 | Bowen | | 717/129 |
| 2005/0060133 A1 * | 3/2005 | Schuppe | | 703/22 |

OTHER PUBLICATIONS

Ou et al, "MATLAB/Simulink Based Hardware/Software Co-Simulation for Designing Using FPGA Configured Soft Processors", Apr. 2005, University of Southern California, Los Angeles, pp. 1-8.*

Xilinx, "ModelSim Verilog Tutorial", Jul. 2000, Xilinx, pp. 1-19.*

Formaggio et al, "A Timing-Accurate HW/SW Co-simulation of an ISS with SystemC", Sep. 2004, ACM, pp. 152-157.*

Jingzhao Ou et al.; "Design Space Exploration Using Arithmetic Level Hardware-Software Co-Simulation for Configurable Multi-Processor Platforms"; ACM Transactions on Embedded Computing systems (TECS); vol. 2, No. 3; Sep. 2005; pp. 111-137.

Xilinx, Inc.; U.S. Appl. No. 10/388,681 by Milne et al. filed Mar. 14, 2003.

Xilinx, Inc.; U.S. Appl. No. 10/389,161 by Milne et al. filed Mar. 14, 2003.

Xilinx, Inc.; U.S. Appl. No. 10/3850,133 by Ballagh et al. filed May 20, 2004.

* cited by examiner

*Primary Examiner* — Kamini S Shah
*Assistant Examiner* — Luke Osborne
(74) *Attorney, Agent, or Firm* — LeRoy D. Maunu; Lois D. Cartier

(57) ABSTRACT

Various approaches for co-simulating an electronic system design are described. In one approach, a hardware design function block in the design is instantiated, along with a specification of a software execution platform including external ports and software to execute on the platform. In response to a user instruction to import the software execution platform into the design, a software execution platform interface block is automatically instantiated. A first simulation model is generated from the hardware design function block and the software execution platform interface block and a second simulation model is generated from the software execution platform. The design is co-simulated using the first and second simulation models. Data is communicated between the first simulation model and the second simulation model via the interface block.

16 Claims, 8 Drawing Sheets

SYSTEM-LEVEL HARDWARE AND SOFTWARE DEVELOPMENT AND CO-SIMULATION SYSTEM

FIELD OF THE INVENTION

The present invention generally relates to tools for developing electronic system designs.

BACKGROUND

It is becoming common for electronic system designers to create designs including both field programmable gate arrays (FPGAs) and one or multiple general purpose or special purpose processors embedded in or attached to the FPGA devices. However, present tools provide little assistance in the overall design flow for both software and hardware components of the system.

Various tools are used to create the hardware and software components of the system. For hardware parts of the system, high-level modeling system (HLMS) based design tools are becoming popular. These tools allow electronic designs to be described, assembled, and debugged at the high-level within a high-level modeling environment (e.g., MATLAB/Simulink and Ptolemy). As an important functionality, once the high-level modeling processing is completed, these HLMS based design tools can automatically translate the high-level models into corresponding low-level hardware implementations.

For software parts of the system, there are many integrated development environments (IDEs) that allow the configuration and generation of simulation models of a software execution platform, as well as the compilation of embedded software programs to be run on the execution platform. One example IDE is the Xilinx Embedded Development Kit (EDK). The EDK tool includes tools required to create, edit, compile, link, load, and debug high-level language code, usually C or C++, for execution on a processor engine or "software execution platform." In addition, the EDK provides "virtual platform" (or "software execution platform") simulation models that simulate the embedded processor on which the system software executes.

During the system development process it is desirable to simulate both the hardware parts of the system and the software parts of the system simultaneously. However, little support is provided for establishing the mechanisms for controlling the simulation of both parts of the system. A suitable simulation requires exchange of data between the simulated hardware and software components and some level of synchronization between the hardware and software components. Within the framework provided by some present tools, however, it may be left to the designers to create data exchange and synchronization control.

The present invention may address one or more of the above issues.

SUMMARY OF THE INVENTION

The various embodiments of the invention provide for co-simulating an electronic system design. In one embodiment, a hardware design function block in the design is instantiated, along with a specification of a software execution platform including external ports and software to execute on the platform. In response to a user instruction to import the software execution platform into the design, a software execution platform interface block is automatically instantiated. A first simulation model is generated from the hardware design function block and the software execution platform interface block and a second simulation model is generated from the software execution platform. The design is co-simulated using the first and second simulation models. Data is communicated between the first simulation model and the second simulation model via the interface block.

In another embodiment, an apparatus is provided for co-simulating an electronic system design. The apparatus comprises means for instantiating a hardware design function block in the design in response to user input; means for establishing in response to user input, a specification of a software execution platform including external ports and software to execute on the platform; means for automatically instantiating a software execution platform interface block in response to a user instruction to import the software execution platform into the design, the software execution platform interface block having ports compatible with the external ports of the software execution platform; means for generating a first simulation model from the hardware design function block and the software execution platform interface block and a second simulation model from the software execution platform; means for co-simulating the first and second simulation models; and means for communicating data between the first simulation model and the second simulation model via the interface block.

An article of manufacture is provided in another embodiment. The article of manufacture comprises a processor-readable medium configured with instructions that are executable by one or more processors for co-simulating an electronic system design by performing the steps including, instantiating a hardware design function block in the design in response to user input; establishing in response to user input, a specification of a software execution platform including external ports and software to execute on the platform; automatically instantiating a software execution platform interface block in response to a user instruction to import the software execution platform into the design, the software execution platform interface block having ports compatible with the external ports of the software execution platform; generating a first simulation model from the hardware design function block and the software execution platform interface block and a second simulation model from the software execution platform; co-simulating the first and second simulation models; and communicating data between the first simulation model and the second simulation model via the interface block.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
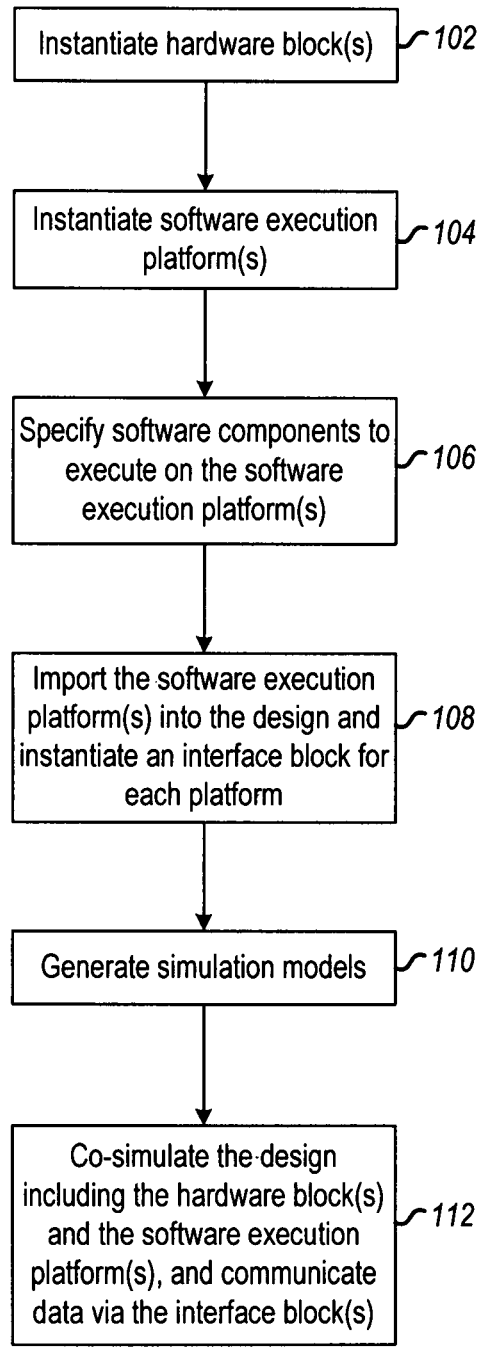
FIG. 1 is a flowchart of an example process in accordance with one embodiment of the invention.

One embodiment of the invention is directed to an integrated design environment (IDE) that allows system-level application development of both custom hardware and software designs. Within the IDE, the end user can focus on specifying the high-level behavior of the target systems. In addition, the end user can simulate and debug the high-level description of the system.

Three co-simulation modes are supported for running various combinations of software simulations, hardware emulations, and/or a hardware-deployed implementation of a system. The modes include lock-step mode, asynchronous mode, and mixed mode. In lock-step mode, the hardware simulations and the software simulations are synchronized at each clock cycle. The lock-step co-simulation provides the user with cycle-accurate simulation information of the entire system. This is desired when the user is developing tightly coupled hardware and software components and the communication interfaces between them, and when the user is verifying the functionalities of the complete system.

In asynchronous mode, the hardware simulations and the software simulations have independent free-running simulation clocks. The simulation process of a specific hardware or software component is stalled only when that component sends/receives data from the other components. The simulation of the component will resume once the data sending operations complete or the requested data becomes available. The asynchronous co-simulation mode may substantially speed up the co-simulation in some scenarios. This is due to the differences in simulation speeds for the hardware and software components that constitute the system. For example, using hardware-in-the-loop simulation techniques, portions of the system can be simulated in the targeted end-use hardware platforms, and data communicated with the other portions of the simulated system through asynchronous, shared-memory based communication interfaces. Since the hardware-in-the-loop simulation technique provides a faster simulation speed than that based on software-only simulation models, maintaining an asynchronous data-driven relationship between the two different simulation processes may accelerate the overall co-simulation speed.

The asynchronous co-simulation mode also allows the co-simulation process to interact with a range of simulators and hardware devices. For example, the asynchronous co-simulation mode enables the integration of virtual hardware simulation models, which imitate the behavior of the actual hardware devices and can also interact with other hardware devices.

In mixed mode co-simulation, the user is provided with explicit or implicit run-time controls for dynamically switching between lock-step mode and asynchronous mode during the co-simulation process. The mixed mode provides the advantages of the lock-step and asynchronous modes as may be most suitable for simulating different portions of a particular system design.

The various embodiments of the invention also support debugging facilities for use during co-simulation. Hardware and software breakpoints may be set, and the state of the simulated components may be examined. A convenient graphical user interface (GUI) is provided for setting the hardware and software breakpoints and examining states of various components.

FIG. 1 is a flowchart of an example process in accordance with one embodiment of the invention. The process provides to a system designer a convenient method for developing an overall system design including hardware and software components and establishing suitable simulation models for verifying the design. An example of hardware to which such a design may be targeted is a field programmable gate array (FPGA). Some FPGAs include one or more processors embedded within the programmable logic fabric of the device, and some designs may implement one or more processors in the programmable logic of the FPGA.

In an example implementation, the MATLAB/Simulink high-level modeling environment is extended to allow a user to describe, simulate, and debug a system having both hardware and software components. Hardware blocks are instantiated in the user design in response to user input to the system (step 102). Toolboxes may be added to the MATLAB/Simulink environment to permit a user to select hardware components suitable for a specific hardware platform such as an FPGA. For example, the SysGen tool from Xilinx presents a visual, data flow-based environment for developing hardware designs for Xilinx FPGAs.

For a system design that includes software and a platform on which the software is to execute, one embodiment of the invention instantiates a software execution platform in response to user input (step 104). In a specific implementation, the capabilities of the Xilinx EDK are made accessible from within the MATLAB/Simulink environment. Through EDK, the user can describe the connections between hardware peripherals and processors, cache size, memory mapping. In addition, through EDK the user may specify the software to execute on the platform (step 106).

Once the software execution platform and software have been specified, the combination is imported into the design at the direction of the user by way of a toolbox extension to the MATLAB/Simulink environment. The toolbox extension instantiates an interface block for each imported platform (step 108). Each hardware design interface block has ports compatible with the external ports of the associated software execution platform for communicating with the ports of the specified hardware components of the design.

Simulation models are generated from the instantiated hardware components and interface block(s) (step 110). The simulation models may be generated by way of conventional features of the MATLAB/Simulink environment and toolboxes for hardware components, and using a compiler to compile a software-based simulation model for the software execution platform. The interface block created for a software execution platform includes the simulation models, for example, software-based simulation models, which may be used to simulate the platforms on which the software components of the system execute.

Once the simulation models are prepared, the design may be co-simulated (step 112). It will be recognized that "co-simulation" generally refers to use of hardware for simulating some components and software models for simulating other components. It will be recognized that co-simulation also refers to software-based simulation in which one software simulation model is used for the hardware blocks of the design and another software simulation model is used for the software execution platform and associated software components. During simulation, data is communicated between the simulation model of the hardware blocks and the simulation model of the software execution platform via the interface block.

The co-simulation of step 112 generally proceeds in one of two user-selectable modes, a lock-step mode or an asynchronous mode. In lock-step mode, each simulation model executes for a selected number of simulation cycles and signals the other simulation model upon completion. The other simulation model then executes for a selected number of cycles and signals the first simulation model when it completes. In asynchronous mode, which is generally used when one or more of the hardware blocks are co-simulated in hardware, each simulation model executes simulation cycles independent of the other simulation model but may be stalled or have to wait to either output data to the other model or input data from the other model.

Figure 2:
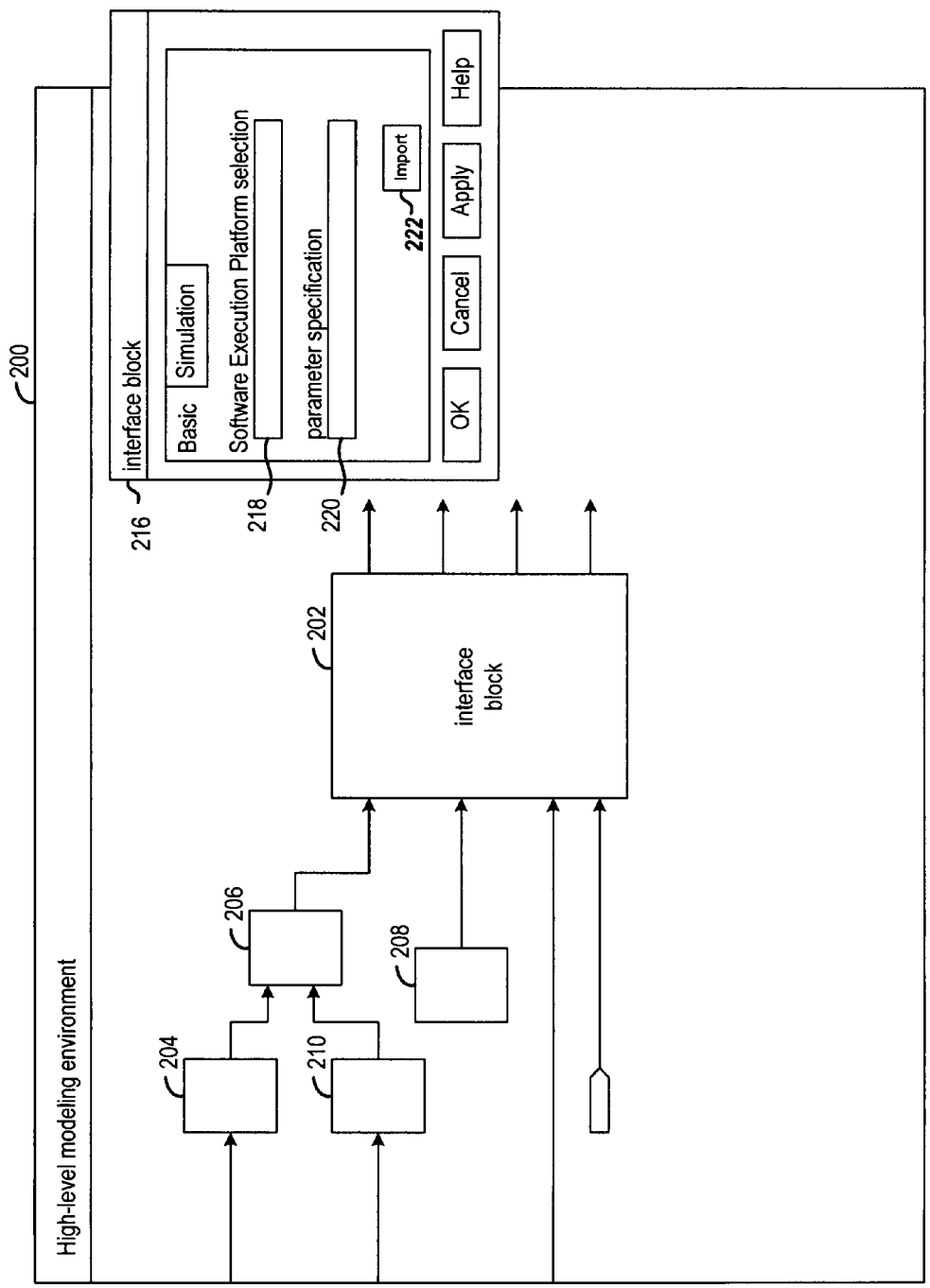
FIG. 2 is an example user interface window that illustrates a hardware design block, a software execution platform, and an interface block.

FIG. 2 is an example user interface window 200 that illustrates importing of a virtual software execution platform into a high-level modeling environment for simulation with hardware design blocks. Within the high-level modeling environment, the user instantiates the software execution platform interface block 202 along with hardware blocks 204, 206, 208, and 210. The design may include additional hardware blocks that are not shown.

The attributes of the interface block 202 are automatically created in response to the user importing the software execution platform into the high-level hardware design. The attributes of the interface block are assigned using interface block window 216, which may be activated by way of user selection of the block 202 in the window 200.

The user specifies or selects a particular software execution platform via box 218. The software execution platform is one created via a tool kit such as the Xilinx EDK, for example. The user may further specify other parameters such as type of processor, a targeted simulation board, and naming of various memories to couple to the software execution platform as illustrated with box 220. It will be appreciated that box 220 is not intended to provide for only a single parameter value, but represents multiple parameters and multiple modes of data entry.

The import button 222 may be selected by the user once the platform has been selected and the desired parameter values specified. In response, the high-level modeling environment, as reflected in window 200, updates the characteristics of interface block 202. For example, the interface block is updated with numbers and names of ports of the software execution platform. Once imported, the input/output ports of the software execution platform appear as input/output ports of the interface block, and user-selected hardware blocks can directly connect to these ports to interact with the imported software platform.

Figure 3:
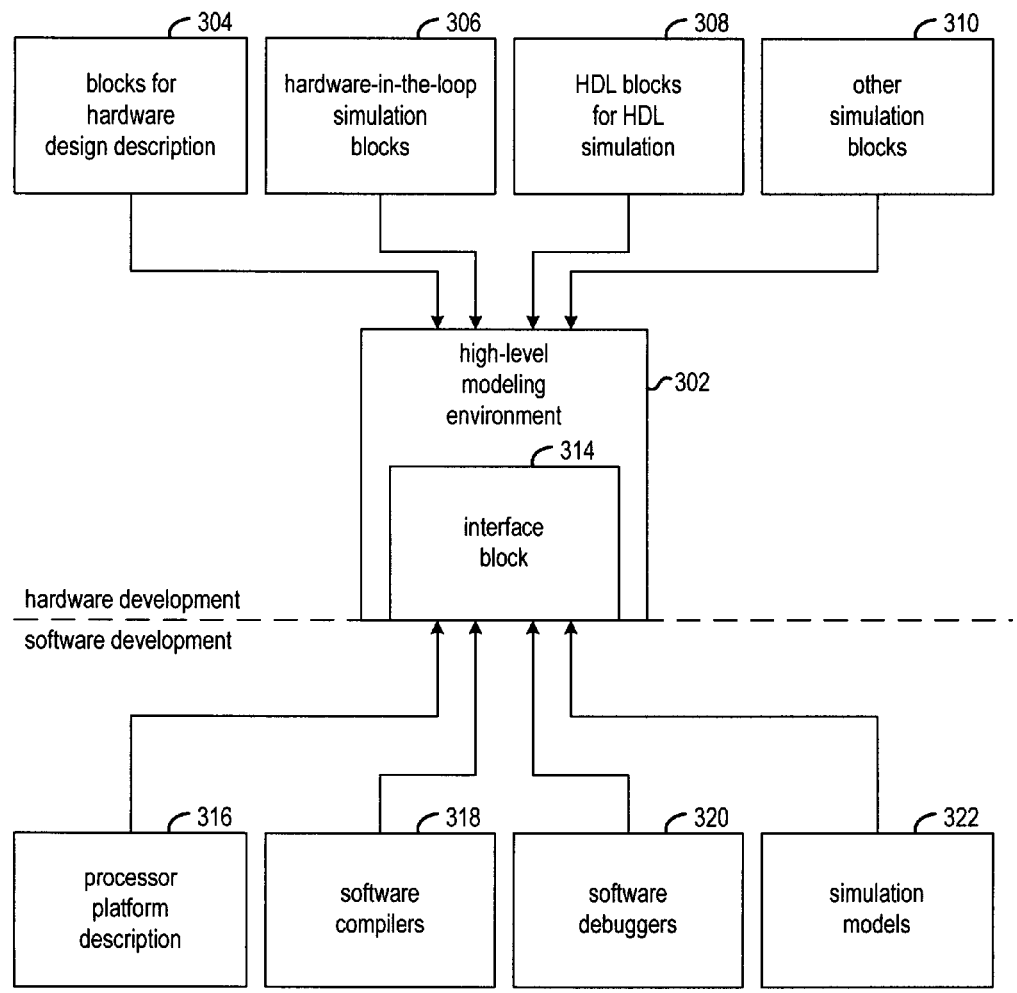
FIG. 3 is a block diagram that shows the combination of the hardware and software development environments via a software execution platform interface block in accordance with one embodiment of the invention.

FIG. 3 is a block diagram that shows the combination of the hardware and software development environments via a software execution platform interface block in accordance with one embodiment of the invention. A number of hardware and software application development tools are combined to allow a user to perform hardware-software design description, co-simulation and co-debugging within a high-level modeling environment. A high-level modeling environment 302, with capabilities such as the MATLAB/Simulink high-level modeling environment, provides hardware design and modeling capabilities.

The MATLAB/Simulink modeling environment is extendable by way of toolboxes. In the example embodiment, toolboxes 304, 306, 308, and 310 provide various additional modeling capabilities to the basic MALTAB/Simulink environment. Tool boxes 304, 306, and 308 provide capabilities for FPGA-based hardware development within the MATLAB/Simulink environment. These capabilities are provided by the SysGen tool, which presents a visual data flow based application development environment.

The blocks for hardware description of toolbox 304 provide a set of blocks, each of which represents a specific arithmetic operation that can be performed on supported FPGA devices. By dragging these blocks into the design and connecting them properly, the user can specify the arithmetic behaviors of the system.

The hardware-in-the-loop simulation blocks of tool box 306 allow the MATLAB/Simulink environment to perform simulation in cooperation with the actual hardware devices through USB and/or Ethernet interfaces, for example.

The HDL blocks for HDL simulation of toolbox 308 provide the ModelSim Simulink block, which can interface MATLAB/Simulink with the ModelSim simulator. Using the Simulink block, the end user can simulate designs that are set forth in HDL (Hardware Description Language) format through the interaction between the ModelSim simulator and the SysGen tool.

Simulation of both hardware components and software components within one simulation environment, and capabilities for debugging both hardware components and software components within one environment are supported by various embodiments of the invention.

The software execution platform interface block 314 links a set of tools for software application development with the high-level modeling environment 302. The set of tools includes user interfaces 316 for processor execution platform description, software compilers (e.g., the GNU gcc tool) 318, software debuggers (e.g., the GNU gdb tool and the Xilinx Microprocessor Debugger tool, etc.) 320. The tools also incorporate the software simulation models of the general-purpose processors, the hardware peripherals for the processors, and the bus communication interfaces between them.

The software execution platform interface block 314 allows the description of high-level hardware design, software design, and software execution platform design within the high-level modeling environment 314 and supports the lock-step, asynchronous, and mixed co-simulation modes between the hardware components and the software execution platforms.

Figure 4:
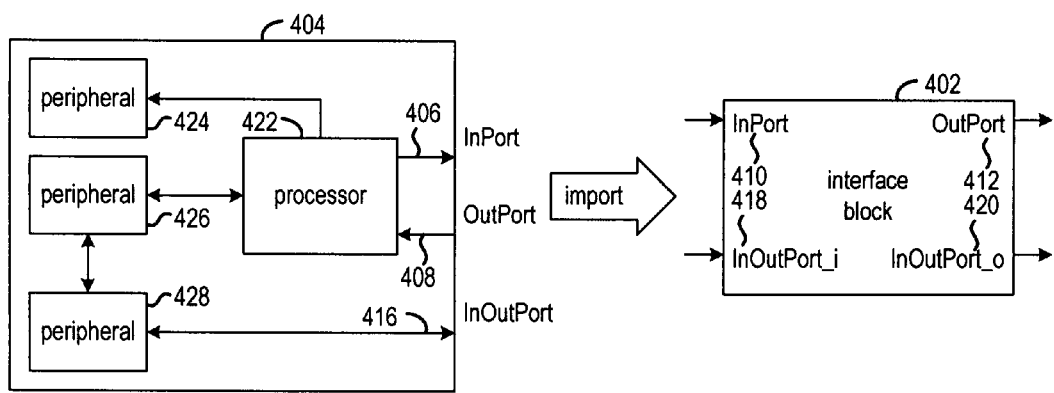
FIG. 4 is a block diagram that shows a software execution platform interface block that results from importing a software execution platform into a high-level hardware design.

FIG. 4 is a block diagram that shows a software execution platform interface block 402 that results from importing a software execution platform into a high-level hardware design. It is through the interface block 402 that the arithmetic-level abstractions for hardware platform development and the interfacing level abstractions for configuration of the processor can be combined into a complete system.

Through the arithmetic-level abstractions provided by the high-level modeling environment, the user can describe the arithmetic-level behavior of the hardware platform, for example, using the Simulink blocks provided by the SysGen tool. In an example use, during the high-level arithmetic-level modeling the user can specify delaying for one cycle the presence of a value at a destination Simulink block. The corresponding low-level implementation may be implemented with a specific number of flip-flop registers based on the data type of the high-level signal and the wires that connect the registers to the low-level implementations of other components. The SysGen tool also can automatically generate the low-level implementation.

The EDK provides the interface level abstractions for configuration of the processor systems. A script based MHS (Microprocessor Hardware System) file prepared by the user describes the connections between the hardware peripherals of the processors. The user may also specify in the MHS file the cache size and memory mapping and other characteristics, as well as the hardware peripherals of the processor.

A respective interface block 402 is generated for each software execution platform 404 imported into the design. For a global input port 406 or global output port 408 of the software execution platform, the interface block 402 includes an input port 410 and output port 412 in the high-level modeling environment with the same port name. On software execution platform 404 the InPort shown as pointing out from the block and the OutPort shown as pointing in to the block because the names are relative to the high-level modeling environment. Thus, output from the software execution platform may be input to the hardware blocks of the high-level modeling environment via the interface block 402, and output from the hardware blocks may be input to the software execution platform via interface block 402. For a global port of the software execution platform that is used for both data input and data output (InOutPort 416), the interface block includes both an input port 418 and an output port 420. The name of the input port is the name of the global port suffixed with "_i". Similarly, the name of the output port is suffixed with "_o". The global ports are the interfaces through which the software execution platform interacts with other hardware components contained within the high-level modeling environment. They are also the interfaces for the software execution platform to interact with other software execution platforms.

The software execution platform 404 includes processor 422 and peripherals 424, 426, and 428. Example peripherals include an on-chip peripheral bus, a UART, interrupt and memory controllers, and general purpose input/output controllers. The software drivers for controlling the hardware peripherals are automatically generated by EDK, for example. The software programs running on the processors are also developed and compiled within the EDK software application development environment. The interface blocks reference the binary executables as a result of compiling the software programs and later use these executables for co-simulation and co-debugging.

Figure 5:
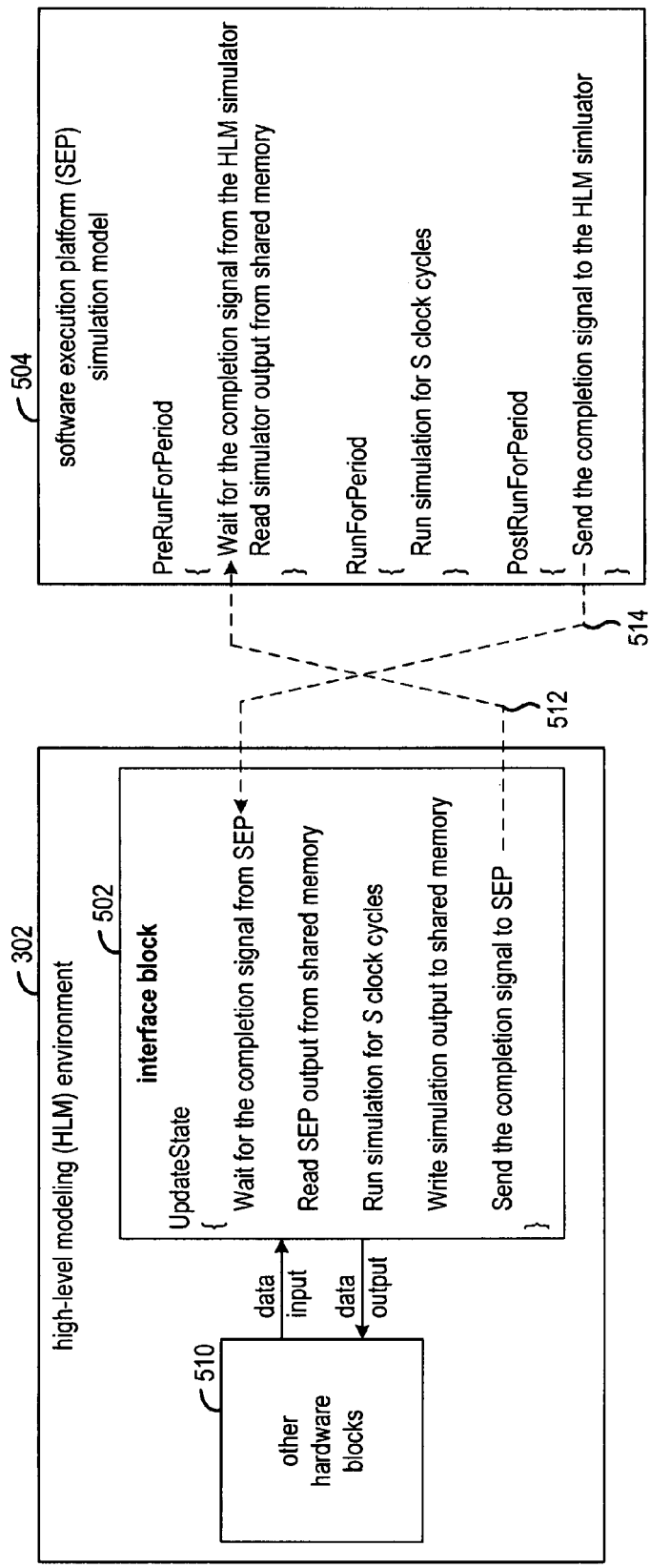
FIG. 5 is a block diagram that illustrates lock-step synchronization between hardware components of a design and software components as provided by an interface block.

FIG. 5 is a block diagram that illustrates lock-step synchronization between hardware components of a design and software components as provided by an interface block. The designs described using the high-level modeling environment may be compiled into a single C simulation model including interface block 502. For each software execution platform, a C simulation model (e.g., 504) may be generated using the Virtual Platform tool provided by EDK, for example. It will be recognized that block 504 shows only the instructions relevant to synchronization. The simulation model 504 can be used to simulate the processor and its hardware peripherals during the execution of the software program on the processor.

Clocks are used to control the progress of the simulation within the high-level modeling environment 302 and the software execution platform simulation model 504. In the example embodiment, the simulation clock of the high-level modeling environment is used as a global clock to manage the clocks of the various simulation models as dictated by the chosen simulation modes.

In lock-step co-simulation mode the hardware and software simulations are synchronized to a single simulation clock, and simulation data is exchanged during each simulation clock cycle. This ensures that the end user can obtain cycle-accurate co-simulation information of the complete execution platform.

The high-level modeling environment 302 and simulation model 504 run in different program processes. The multi-process execution offers flexibility to support the different synchronization modes. Data are communicated through shared memory, which promotes efficiency of the co-simulation. During one cycle of the high-level modeling system, the interface block(s) employed will invoke the simulation model(s) of the software execution platforms to consume one simulation clock cycle. At the conclusion of the cycle, simulation data is exchanged to maintain the cycle-accuracy of the simulation.

Two system-wide semaphores, Sem_SEP and Sem_HLM are used for synchronizing the hardware and software simulation processes on a cycle-accurate, lock-step basis. The high-level modeling (HLM) environment holds both Sem_SEP and Sem_HLM during initialization. The software execution platform simulation model waits for the completion signal from the high-level modeling environment by waiting on Sem_SEP while the high-level modeling environment waits for the completion signal from the software execution platform (SEP) model by waiting on Sem_HLM.

If the processing rate of the interface block 502 is set to K, the UpdateState( ) function of the interface block is invoked every K simulation cycle(s). When invoked, the interface block waits for the SEP simulation model 504 to finish a set of simulation operations by waiting on Sem_SEP. Once the SEP simulation model completes the set of simulation operations, it sends the completion signal to the HLM simulation by releasing Sem_SEP. Once the interface block obtains Sem_SEP, it will read the output of the SEP simulation model from the shared memory and present the data at its corresponding output ports for other simulated hardware blocks 510. The interface block then lets the HLM simulation run for S clock cycles and writes the HLM simulation data values present at its input ports back to the shared memory. At the end of the UpdateState( ) function, the interface block sends the completion signal to the SEP simulation model by releasing Sem_HLM (shown as line 512).

Similarly, the SEP simulation model waits for the completion signal from the HLM environment by waiting on Sem_HLM. Once the SEP simulation model obtains Sem_HLM, it will read the output of the HLM environment from the shared memory and then resume its simulation for one simulation clock cycle. The SEP simulation model writes its simulation result data back to the shared memory, which can be later read by the HLM environment. At the end of the simulation, the SEP simulation model sends the completion signal to the HLM simulation by releasing Sem_HLM (shown as line 514). Note that the above operations are accomplished using three functions: PreRunForPeriod( ), RunForPeriod( ), and PostRunForPeriod( ). These three functions are called separately in the above order during each invocation of the SEP simulation model. This minimizes the required changes to the RunForPeriod( ) function, which is automatically generated by the software execution platform development tool.

Figure 6:
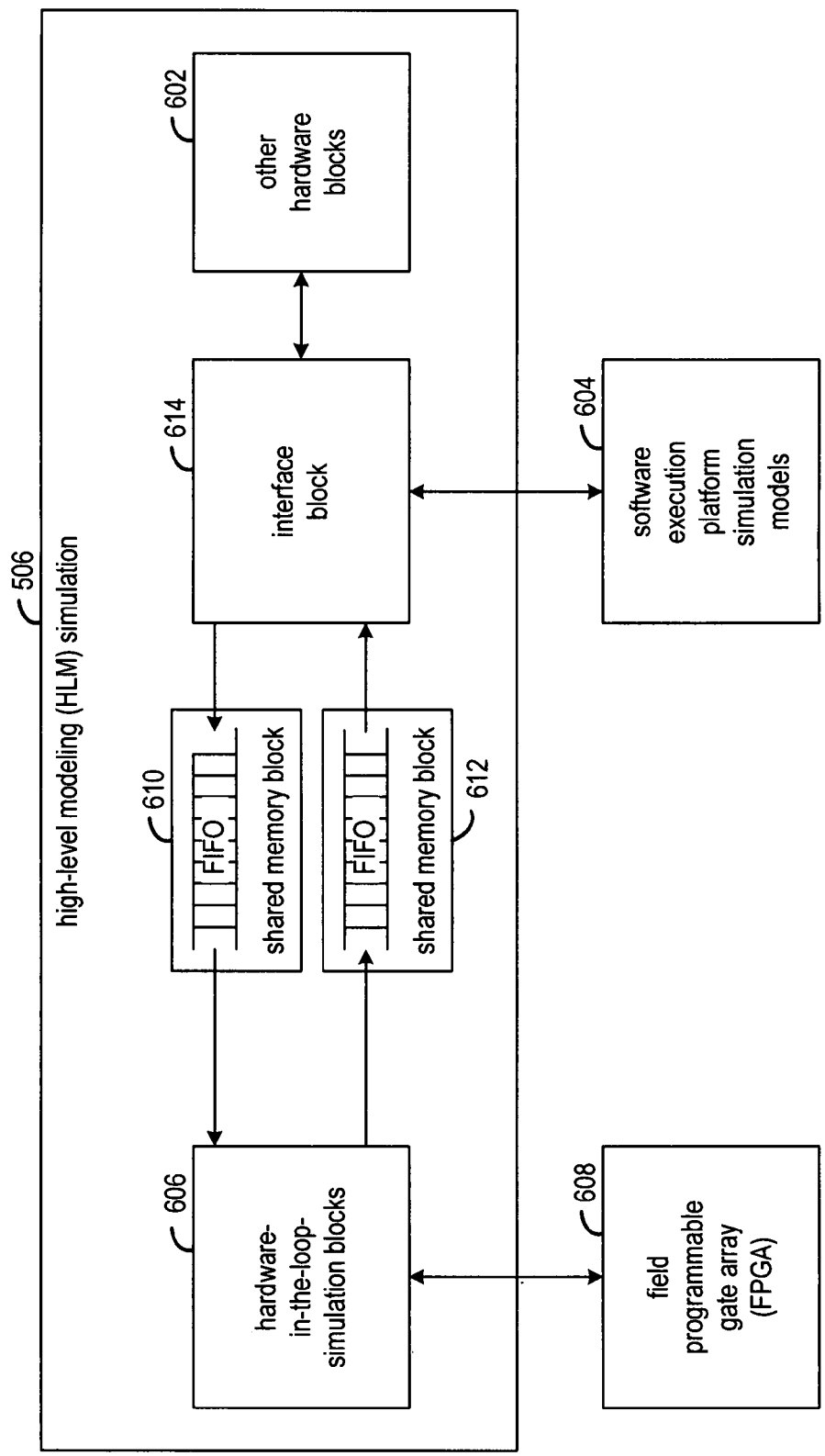
FIG. 6 is a block diagram that shows components in a simulation environment in which the simulated components run asynchronously.

FIG. 6 is a block diagram that shows components in a simulation environment in which the simulated components run asynchronously. The asynchronous mode supports co-simulation between software-based simulation models (other hardware blocks 602 and software execution platform simulation models 604) and simulation of components on hardware devices, for example, hardware-in-the-loop simulation blocks 606 which are implemented on FPGA 608.

For co-simulation in asynchronous mode, there are multiple independent simulation and/or physical hardware clocks in operation at the same time. The simulation of the hardware and/or software components is driven by different independent simulation clocks and the progression of the simulation is controlled by the data communication requirements between the hardware component and/or the software components running on the processors. One example is the hardware-in-the-loop-simulation for an FFT processing hardware component. The simulated FFT component runs an actual hardware device and processes data only when the input data is available or the output data buffer is not full. Otherwise, the simulated FFT component is put in idle state to await the desired conditions. Another example is the simulation of a software program performing a blocking read/write operation. The simulation of the software execution platform using the SEP simulation models would be stalled until the data requested by the read operation becomes available or the requested data writing operation completes.

The asynchronous co-simulation mode may be supported within the high-level modeling simulation by shared memory blocks 610 and 612, which are used to store the data that needs to be transmitted between the hardware and/or software simulation processes running in asynchronous co-simulation mode. Each shared memory block only simulates the data transmission in a single direction. Thus, each shared memory block maintains one FIFO (First-In-First-Out) data structure, and for co-simulation of bi-directional data flow, two shared memory blocks are required. The interface block 614 reads from and writes to the shared memory blocks on behalf of the software execution platform simulation models 604, and the hardware-in-the-loop simulation blocks 606 read from and write to the shared memory blocks on behalf of the corresponding blocks implemented on the FPGA 608. The interface block 614 provides the interface between the software execution platform simulation models 604 and hardware-in-the-loop simulation blocks 606, as well as the interface between the software execution platform simulation models 604 and the other hardware blocks 602. It will be appreciated that for other hardware blocks 602 to communicate with the hardware-in-the-loop simulation blocks 606, additional instances of shared memory blocks 610 and 612 would provide the interface, and those additional instances would not be linked to the interface block 614.

For sending simulation data from one component to another component, the sending component is connected to the input port of a shared memory block, and the sending component writes data into the FIFO of the shared memory block. The writing operation and the simulation of the data-sending component are stalled in response to the FIFO being full. The corresponding simulator will check the status of the FIFO of the shared memory block periodically. The data writing operation and the simulation will resume in response to the FIFO having space available for storing incoming data.

For a simulated component that needs to receive data from another simulated component, the receiving component is connected to the output port of a shared memory block and reads data from the FIFO of that shared memory block. The reading operation and the simulation of the data-receiving component are stalled if the FIFO is empty. The corresponding simulator will check the status of the FIFO of the shared memory block periodically and will resume the data reading operation and the simulation in response to data being available in the FIFO.

The shared memory blocks may be created by the high-level modeling environment 506 in response to the importing of a software execution platform and resulting interface block 614.

Figure 7:
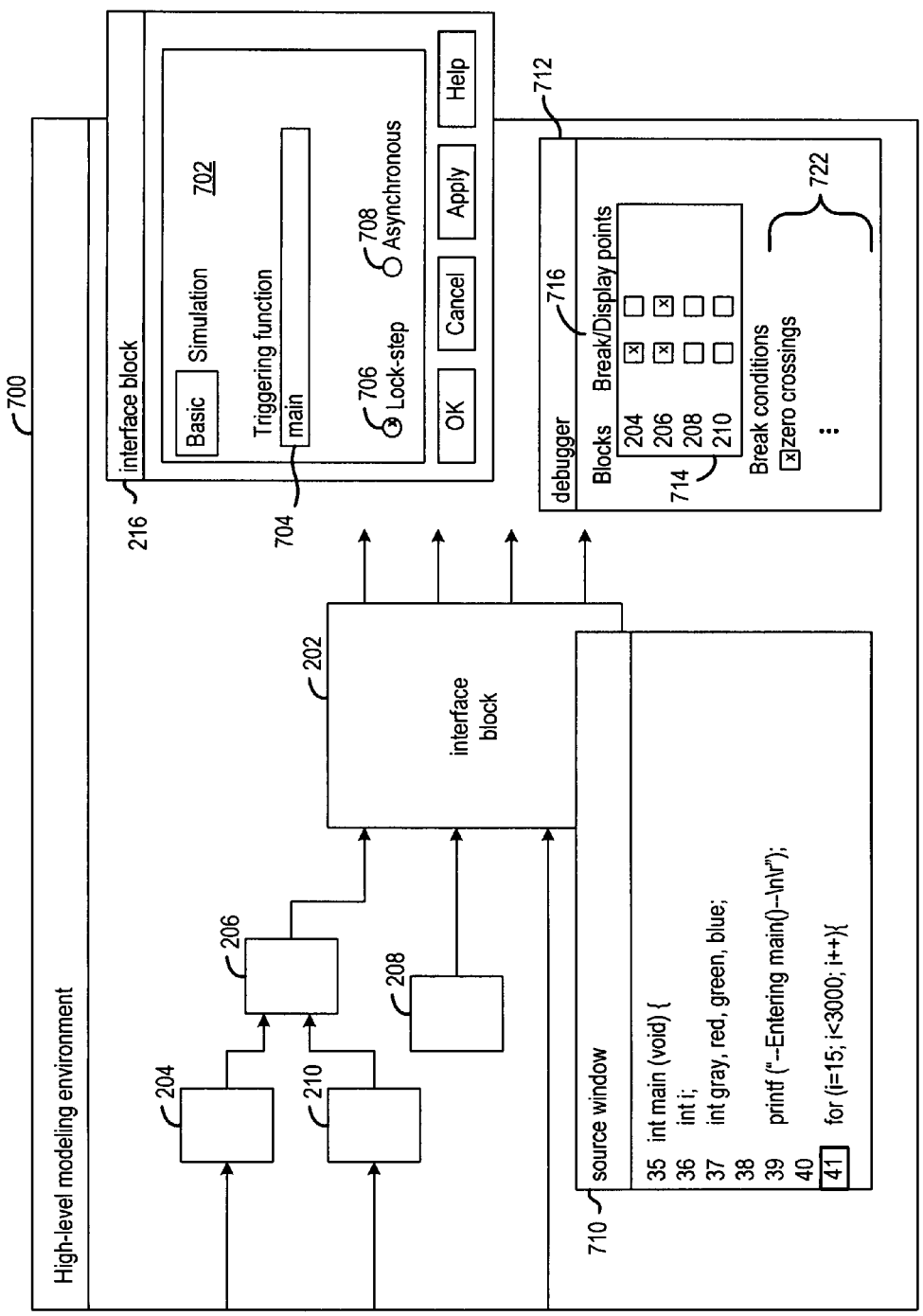
FIG. 7 is an example user interface screen for specifying various mixed-mode co-simulations.

FIG. 7 is an example user interface screen 700 for specifying various mixed-mode co-simulations. In mixed-mode co-simulation, the simulation switches between lock-step and asynchronous modes of simulation in response to user-specified controls associated with the design. In one embodiment, an interface is provided which allows the user to identify functions of code in the software components of the system design for simulation in either lock-step or asynchronous modes. When a designated function is entered during simulation, the simulation model proceeds according to the designated mode.

Through interface block window 216 under the simulation tab 702, simulation parameters may be specified for software functions during mixed mode co-simulation. The user may specify a source code function in box 704, for example, main, which upon entering during co-simulation, the co-simulation mode proceeds according to the user-designation. The example setting in check box 706 for main shows that the co-simulation of main will proceed in lock-step mode when the function is entered. The user may alternatively specify with checkbox 708 that the function proceeds in asynchronous mode when the function is entered. Thus, the co-simulation mode may be switched from lock-step to asynchronous or from asynchronous to lock-step according to user specifications. According to the example, the co-simulation of the overall system design may according to user specification operate in asynchronous mode until the main function is entered. Once main is entered, the co-simulation proceeds in lock-step mode. Upon exit from main, the co-simulation mode returns to asynchronous mode. The user may alternatively configure the co-simulation to run in lock-step mode and configure various functions to be co-simulated in asynchronous mode.

In Source window 710, the user may specify software breakpoints. The example code in window 710 is for the function, main( ). A breakpoint is set for line 41 of the source code, as illustrated by the block around the number 41. The breakpoint may be set by right clicking on the line number, for example.

Debugger window 712 may be used to specify hardware breakpoints for blocks in the design for use in combination with the software breakpoints. The debugger window contains a list 714 of the blocks in the design, and for each block a pair of check boxes 716 for specifying whether a breakpoint or a display point is set. Along with selecting one or more hardware blocks, the condition(s) upon which a break in the co-simulation is to occur or upon which signal values are to be displayed, are specified with the check boxes associated with the illustrated example conditions 722. For example, with the break condition set to zero crossings, a breakpoint is set for block 204, and both a breakpoint and a display point are set for block 206. A breakpoint temporarily interrupts the co-simulation when one of the specified break conditions is satisfied by the block during co-simulation. When the display point is specified for a block, the hardware simulation environment outputs the signal values at the input port of a block and at the output port of a block in response to the satisfaction of the user-selected conditions.

An example condition includes zero crossings. The zero crossing break condition specifies that the simulation is paused whenever the value of any port under debugging reaches zero. Those skilled in the art can use the HLMS to construct other suitable conditions based on the zero crossing condition.

Figure 8:
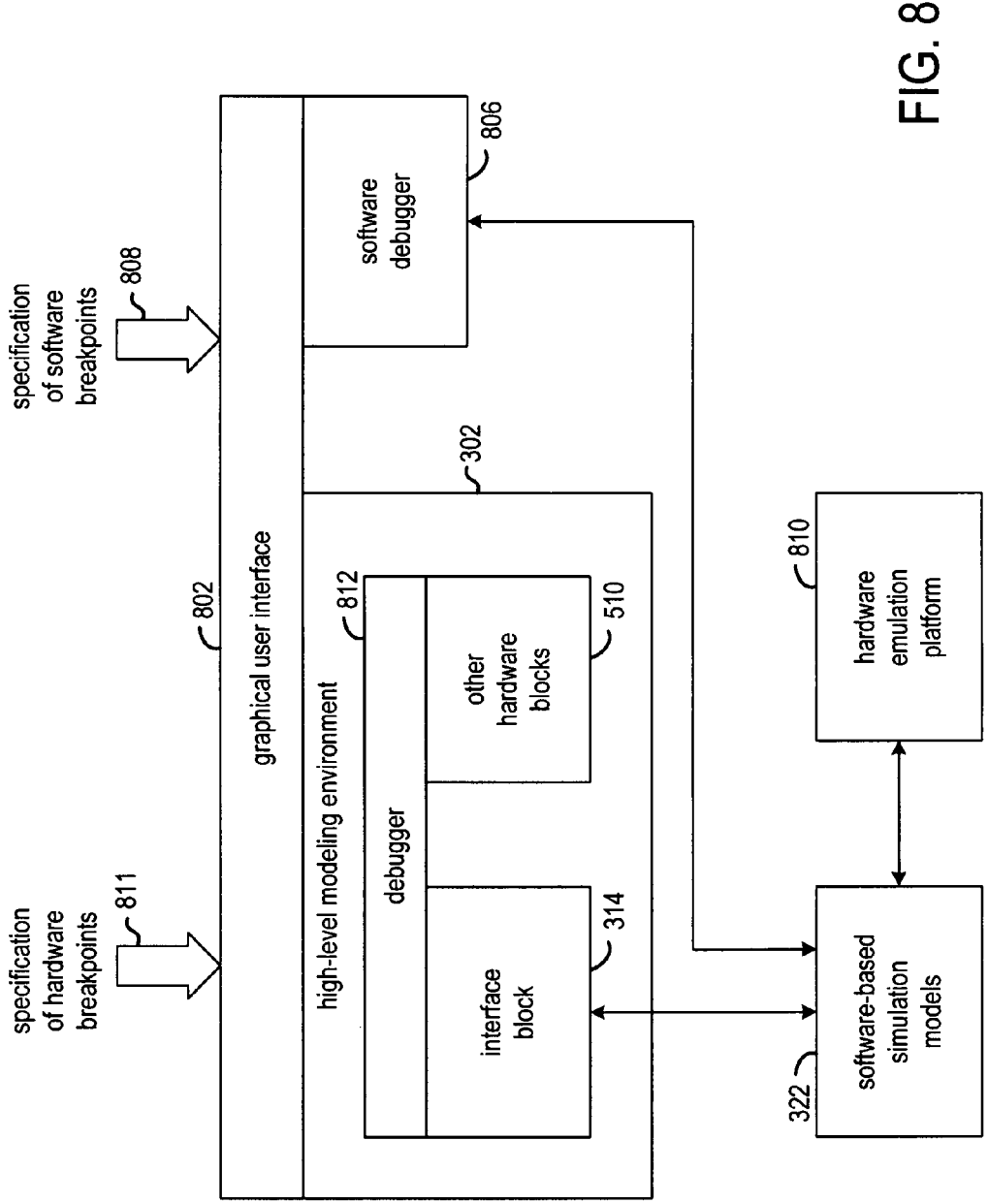
FIG. 8 is a block diagram of an arrangement for setting hardware and software breakpoints in a co-simulated hardware-software system in accordance with various embodiments of the invention.

FIG. 8 is a block diagram of an arrangement for setting hardware and software breakpoints in a co-simulated hardware-software system in accordance with various embodiments of the invention. A single graphical user interface (GUI) 802 unifies the interfaces of the software program debuggers 806 (e.g., GDBs, the GNU debuggers) and the debugger 812 of the high-level modeling environment.

For software components, one or more software debugger(s) may be invoked depending on debugging requirements. The user can then set breakpoints (input 808) within any of the software components executed through the GDB debugger(s). When the actual hardware 810 is available (as opposed to a software model of a software execution platform), the user can set up hard/soft breakpoints for the software programs running on the physical hardware through interfaces via boundary scan interfaces, for example.

Hardware breakpoints (input line 811) may be established so that the co-simulation is stalled when the status of a specific hardware component satisfies the specified conditions. This may be accomplished through the debugger 812 of the high-level modeling environment. The end user invokes the co-simulation process using the debugger 812 and can then specify within the debugger the desired conditions of the hardware components under which the co-simulation process should stop. For example, the user can specify that the co-simulation process should stop if a desired value appears at the output port of a multiplication hardware block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for developing electronic systems having both custom hardware and custom software components executing on an embedded processor, for example. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-based method for co-simulating an electronic system design, comprising:
    instantiating a hardware design function block in the design in response to user input;
    establishing in response to user input, a specification of a software execution platform including external ports and software to execute on the platform;
    automatically instantiating a software execution platform interface block in response to a user instruction to import the software execution platform into the design, the software execution platform interface block having ports compatible with the external ports of the software execution platform;
    generating a first simulation model from the hardware design function block and the software execution platform interface block and a second simulation model from the software execution platform;
    displaying a user interface object for selecting between a lock-step mode or an asynchronous mode for co-simulation;
    setting a simulation mode to one of the lock-step mode or the asynchronous mode in response to user input;
    co-simulating the first and second simulation models;
    in response to user designation of a first portion of the software to be co-simulated in lock-step mode, and user designation of a second portion of the software to be co-simulated in asynchronous mode, co-simulating in lock-step mode in response to entering execution of the first portion of the software during co-simulation, and co-simulating in asynchronous mode in response to entering execution of the second portion of the software during co-simulation;
    wherein while co-simulating in the lock-step mode, the first simulation model and the second simulation model each repeat a sequence including waiting to commence execution until the other signals completion of executing for a selected number of simulation cycles, reading data from the other upon commencing execution, executing for the selected number of cycles, and signaling completion upon completing execution of the selected number of simulation cycles;
    wherein while co-simulating in the asynchronous mode, each of the first simulation model and the second simulation model execute independent of a number of simulation cycles for which the other executes, and the co-simulating of the first simulation model stalls while waiting for data from the second simulation model and the co-simulating resumes in response to the data from the second simulation model being available; and
    communicating data between the first simulation model and the second simulation model via the software execution platform interface block.

2. The method of claim 1, further comprising:
co-simulating the first simulation model in a first software process and the second simulation model in a second software process.

3. The method of claim 1, further comprising:
establishing first and second FIFO data structures coupled to the first simulation model and to the software execution platform interface block;
wherein co-simulating in the asynchronous mode includes:
    the first simulation model writing data to the second FIFO data structure and reading data from the first FIFO data structure;
    the second simulation model writing data to the first FIFO data structure and reading data from the second FIFO data structure via the software execution platform interface block;
    temporarily suspending co-simulation of the first simulation model in response to the first simulation model attempting to read from the first FIFO data structure and the first FIFO data structure being empty;
    temporarily suspending co-simulation of the first simulation model in response to the first simulation model attempting to write to the second FIFO data structure and the second FIFO data structure being full;
    temporarily suspending co-simulation of the second simulation model in response to the second simulation model attempting to read from the second FIFO data structure and the second FIFO data structure being empty; and
    temporarily suspending co-simulation of the second simulation model in response to the second simulation model attempting to write to the first FIFO data structure and the first FIFO data structure being full.

4. The method of claim 1, further comprising:
providing a first user interface window that displays the instantiated hardware design function block and the instantiated software execution platform interface block;
providing a second user interface window in response to user initiation from the first window, the second window having selectable parameters for setting a breakpoint on the instantiated hardware design function block;
providing a third user interface window in response to user initiation from the first window, the third window displaying source code of the software that executes on the software execution platform;
setting a first breakpoint associated with a first port the hardware design function block in response to user input in the second user interface window, the breakpoint including a set of one or more conditions;
setting a second breakpoint in the software that executes on the software execution platform in response to user selection of a line source code in the third user interface window;
temporarily suspending co-simulation in response to satisfaction of the one or more conditions at the first port; and
temporarily suspending co-simulation in response to execution of the software during co-simulation reaching the user-selected line source code.

5. The method of claim 4, wherein the break conditions include the value of a port equaling zero.

6. The method of claim 4, further comprising:
co-simulating the first simulation model in a first software process and the second simulation model in a second software process.

7. The method of claim 4, further comprising:
establishing first and second FIFO data structures coupled to the first simulation model and to the software execution platform interface block;
wherein co-simulating in the asynchronous mode includes:
the first simulation model writing data to the second FIFO data structure and reading data from the first FIFO data structure;
the second simulation model writing data to the first FIFO data structure and reading data from the second FIFO data structure via the software execution platform interface block;
temporarily suspending co-simulation of the first simulation model in response to the first simulation model attempting to read from the first FIFO data structure and the first FIFO data structure being empty;
temporarily suspending co-simulation of the first simulation model in response to the first simulation model attempting to write to the second FIFO data structure and the second FIFO data structure being full;
temporarily suspending co-simulation of the second simulation model in response to the second simulation model attempting to read from the second FIFO data structure and the second FIFO data structure being empty; and
temporarily suspending co-simulation of the second simulation model in response to the second simulation model attempting to write to the first FIFO data structure and the first FIFO data structure being full.

8. The method of claim 1, wherein the software execution platform represents an instruction processor embedded on an FPGA.

9. The method of claim 1, wherein the software execution platform represents an instruction processor implemented in programmable logic of an FPGA.

10. A system for co-simulating an electronic system design, comprising:
one or more processors;
a memory arrangement coupled to the one or more processors, the memory arrangement configured with program code, that when executed by the one or more processors, cause the one or more processors to perform operations including:
instantiating a hardware design function block in the design in response to user input;
establishing in response to user input, a specification of a software execution platform including external ports and software to execute on the platform;
automatically instantiating a software execution platform interface block in response to a user instruction to import the software execution platform into the design, the software execution platform interface block having ports compatible with the external ports of the software execution platform;
generating a first simulation model from the hardware design function block and the software execution platform interface block and a second simulation model from the software execution platform;
displaying a user interface object for selecting between a lock-step mode or an asynchronous mode for co-simulation; and
setting a simulation mode to one of the lock-step mode or the asynchronous mode in response to user input; and
means for co-simulating the first and second simulation models;
in response to user designation of a first portion of the software to be co-simulated in lock-step mode, and user designation of a second portion of the software to be co-simulated in asynchronous mode, co-simulating in lock-step mode in response to entering execution of the first portion of the software during co-simulation, and co-simulating in asynchronous mode in response to entering execution of the second portion of the software during co-simulation;
wherein while co-simulating in the lock-step mode, the first simulation model and the second simulation model each repeat a sequence including waiting to commence execution until the other signals completion of executing for a selected number of simulation cycles, reading data from the other upon commencing execution, executing for the selected number of cycles, and signaling completion upon completing execution of the selected number of simulation cycles;
wherein while co-simulating in the asynchronous mode, each of the first simulation model and the second simulation model execute independent of a number of simulation cycles for which the other executes, and the co-simulating of the first simulation model stalls while waiting for data from the second simulation model and the co-simulating resumes in response to the data from the second simulation model being available; and
means for communicating data between the first simulation model and the second simulation model via the software execution platform interface block.

11. An article of manufacture, comprising:
a non-transitory processor-readable medium configured with instructions executable by one or more processors for co-simulating an electronic system design by performing the steps including, instantiating a hardware design function block in the design in response to user input;

establishing in response to user input, a specification of a software execution platform including external ports and software to execute on the platform;

automatically instantiating a software execution platform interface block in response to a user instruction to import the software execution platform into the design, the software execution platform interface block having ports compatible with the external ports of the software execution platform;

generating a first simulation model from the hardware design function block and the software execution platform interface block and a second simulation model from the software execution platform;

displaying a user interface object for selecting between a lock-step mode or an asynchronous mode for co-simulation;

setting a simulation mode to one of the lock-step mode or the asynchronous mode in response to user input;

co-simulating the first and second simulation models;

in response to user designation of a first portion of the software to be co-simulated in lock-step mode, and user designation of a second portion of the software to be co-simulated in asynchronous mode, co-simulating in lock-step mode in response to entering execution of the first portion of the software during co-simulation, and co-simulatinq in asynchronous mode in response to entering execution of the second portion of the software during co-simulation;

wherein while co-simulating in the lock-step mode, the first simulation model and the second simulation model each repeat a sequence including waiting to commence execution until the other signals completion of executing for a selected number of simulation cycles, reading data from the other upon commencing execution, executing for the selected number of cycles, and signaling completion upon completing execution of the selected number of simulation cycles;

wherein while co-simulating in the asynchronous mode, each of the first simulation model and the second simulation model execute independent of a number of simulation cycles for which the other executes, and the co-simulating of the first simulation model stalls while waiting for data from the second simulation model and the co-simulating resumes in response to the data from the second simulation model being available; and communicating data between the first simulation model and the second simulation model via the software execution platform interface block.

12. The article of manufacture of claim 11, wherein the instructions further comprise instructions for:

co-simulating the first simulation model in a first software process and the second simulation model in a second software process.

13. The article of manufacture of claim 11, wherein the instructions further comprise instructions for:

establishing first and second FIFO data structures coupled to the first simulation model and to the software execution platform interface block;

wherein co-simulating in the asynchronous mode includes:

the first simulation model writing data to the second FIFO data structure and reads reading data from the first FIFO data structure;

the second simulation model writing data to the first FIFO data structure and reading data from the second FIFO data structure via the software execution platform interface block;

temporarily suspending co-simulation of the first simulation model in response to the first simulation model attempting to read from the first FIFO data structure and the first FIFO data structure being empty;

temporarily suspending co-simulation of the first simulation model in response to the first simulation model attempting to write to the second FIFO data structure and the second FIFO data structure being full;

temporarily suspending co-simulation of the second simulation model in response to the second simulation model attempting to read from the second FIFO data structure and the second FIFO data structure being empty; and temporarily suspending co-simulation of the second simulation model in response to the second simulation model attempting to write to the first FIFO data structure and the first FIFO data structure being full.

14. The article of manufacture of claim 11, wherein the instructions further comprise instructions for:

providing a first user interface window that displays the instantiated hardware design function block and the instantiated software execution platform interface block;

providing a second user interface window in response to user initiation from the first window, the second window having selectable parameters for setting a breakpoint on the instantiated hardware design function block;

providing a third user interface window in response to user initiation from the first window, the third window displaying source code of the software that executes on the software execution platform;

setting a first breakpoint associated with a first port the hardware design function block in response to user input in the second user interface window, the breakpoint including a set of one or more conditions;

setting a second breakpoint in the software that executes on the software execution platform in response to user selection of a line source code in the third user interface window;

temporarily suspending co-simulation in response to satisfaction of the one or more conditions at the first port; and temporarily suspending co-simulation in response to execution of the software during co-simulation reaching the user-selected line source code.

15. The article of manufacture of claim 14, wherein the instructions further comprise instructions for:

co-simulating the first simulation model in a first software process and the second simulation model in a second software process.

16. The article of manufacture of claim 15, wherein the instructions further comprise instructions for:

establishing first and second FIFO data structures coupled to the first simulation model and to the software execution platform interface block;

wherein co-simulating in the asynchronous mode includes:

the first simulation model writing data to the second FIFO data structure and reading data from the first FIFO data structure;

the second simulation model writing data to the first FIFO data structure and reading data from the second FIFO data structure via the software execution platform interface block;

temporarily suspending co-simulation of the first simulation model in response to the first simulation model attempting to read from the first FIFO data structure and the first FIFO data structure being empty;

temporarily suspending co-simulation of the first simulation model in response to the first simulation model attempting to write to the second FIFO data structure and the second FIFO data structure being full;

temporarily suspending co-simulation of the second simulation model in response to the second simulation model attempting to read from the second FIFO data structure and the second FIFO data structure being empty; and temporarily suspending co-simulation of the second simulation model in response to the second simulation model attempting to write to the first FIFO data structure and the first FIFO data structure being full.

* * * * *